Figure 13:
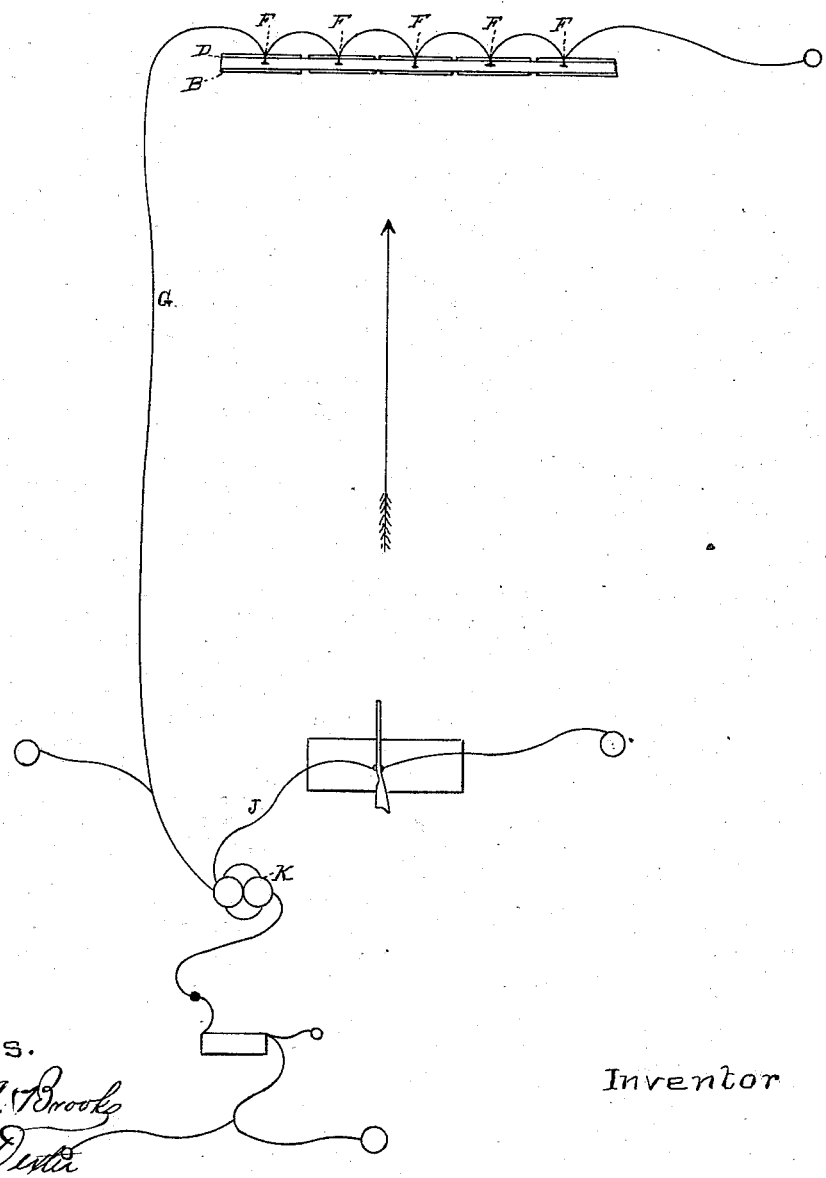

(No Model.)
4 Sheets—Sheet 1.
R. H. SAVAGE.
Electrical Recording Target.
No. 232,417.  Patented Sept. 21, 1880.
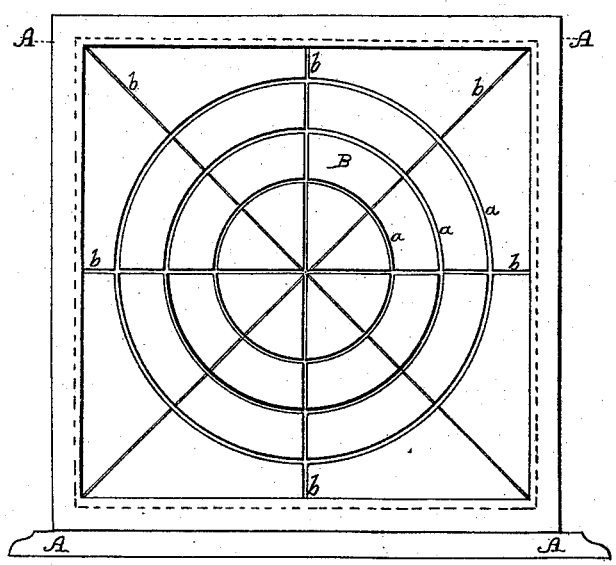
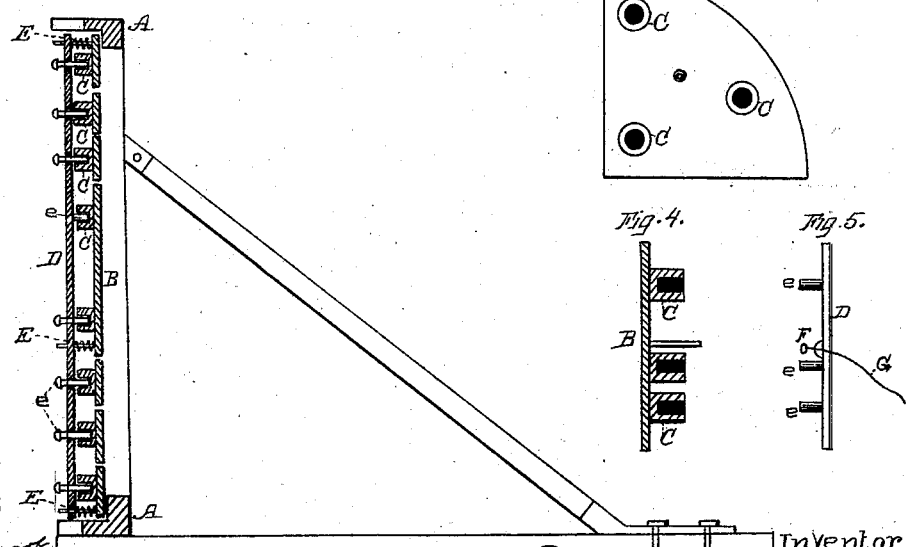
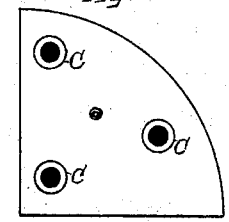
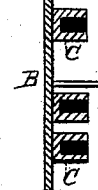
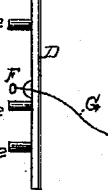

(No Model.) 4 Sheets—Sheet 2.
R. H. SAVAGE.
Electrical Recording Target.
No. 232,417. Patented Sept. 21, 1880.
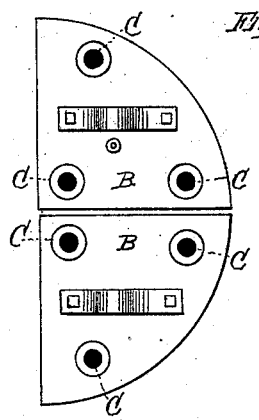
Fig. 6.
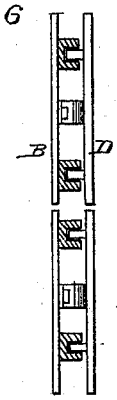
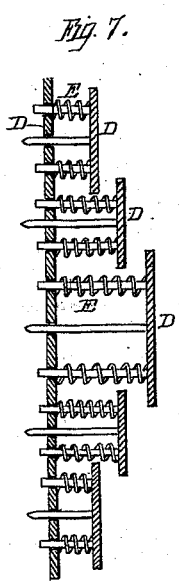
Fig. 7.
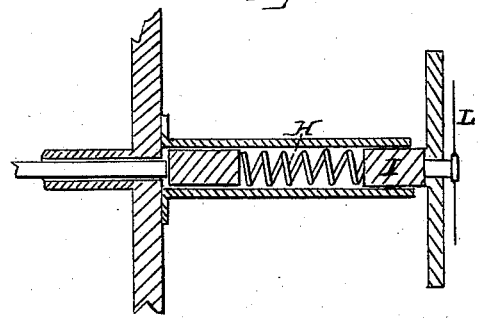
Fig. 8.
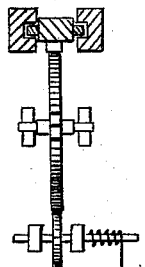
Fig. 9.
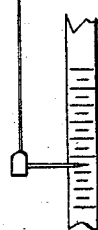
Witnesses
Geo. H. Strong
Frank A. Brook
Inventor
Richard H. Savage
By Dewey & Co.
Attys (No Model.) 4 Sheets—Sheet 3.
R. H. SAVAGE.
Electrical Recording Target.
No. 232,417. Patented Sept. 21, 1880.
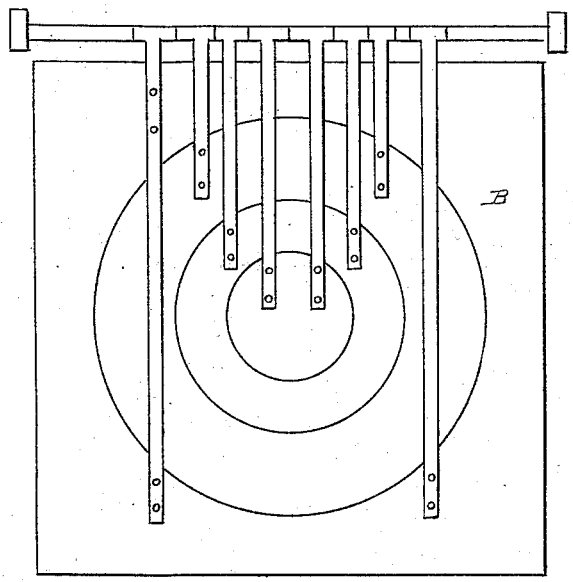
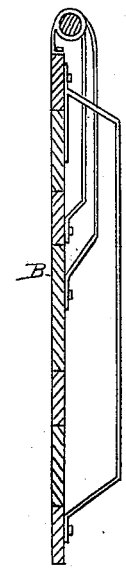
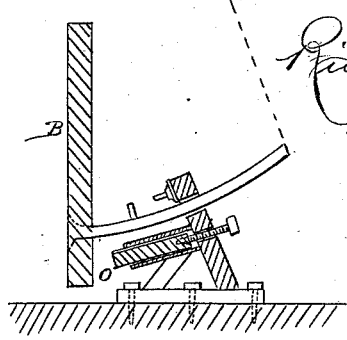
Witnesses
Geo. H. Strong.
Frank A. Brooks
Inventor
Richard H. Savage
By
Dewey & Co.
Attys (No Model.)

4 Sheets—Sheet 4.

R. H. SAVAGE.
Electrical Recording Target.

No. 232,417.   Patented Sept. 21, 1880.

Witnesses.
Frank A. Brooks
H. F. Dexter

Inventor
Richard H. Savage

N. PETERS, PHOTO-LITHOGRAPHER, WASHINGTON, D. C.

UNITED STATES PATENT OFFICE.

RICHARD H. SAVAGE, OF SAN FRANCISCO, CALIFORNIA.

ELECTRICAL RECORDING-TARGET.

SPECIFICATION forming part of Letters Patent No. 232,417, dated September 21, 1880.

Application filed May 28, 1880. (No model.)

*To all whom it may concern:*

Be it known that I, RICHARD H. SAVAGE, of the city and county of San Francisco, and State of California, have invented a Self-Recording Target and Indicator for Small-Arms; and I hereby declare the following to be a full, clear, and exact description thereof.

My invention relates to a self-recording target and indicator for small-arm practice, which is also useful for testing guns, cartridges, and powder for penetration as well as accuracy of aim, as well as to record time of flight of projectiles.

My invention consists of a target which is subdivided into a number of areas, each of which is properly supported and guided, and is free to move backward upon the impact of a shot and be returned to its place by the action of elastic buffers, springs, or hinges, in combination with certain other details of construction, as hereinafter fully described and claimed.

It also consists in a combination of wires, sectional target, a timing device, and the weapon being fired, whereby the velocity of the shot is measured, as hereinafter more specifically described and claimed.

Any form of recording-instrument may be employed to indicate the results of the shots. The wire may be connected with each section of the target, circuit-breakers being attached to each connection and so arranged that each shot will record itself on a slip of paper at the shooting-stand, and indicate, not only the value, but the position of the shot, by any means most convenient and best suited for the purpose.

Referring to the accompanying drawings for a more complete explanation of my invention, Figure 1 is a front view of my target. Fig. 2 is a side elevation. Fig. 3 is a back view of one of the sections. Fig. 4 is a side view of the section. Fig. 5 is a side view of the back plate. Fig. 6 shows one form of returning-spring. Fig. 7 shows the target-sections overlapping. Figs. 8 and 9 show a means for indicating the force of impact. Figs. 10, 11, and 12 show hinged or swinging target and stop. Fig. 13 shows a means for indicating the velocity of the shot.

In my present illustration of my invention I have shown what is known as the "Creedmoor target," consisting of a circular bull's-eye, a center, inner, and outer, these divisions having a value in counting of five, four, three, and two, respectively.

The target is supported by a frame, A A, suitably braced, and it is rabbeted upon its rear edges to prevent the movable plates from moving too far to the front. The face of the target B is formed of steel, chilled iron, or other suitable material, either backed or not, as may be found desirable, and it is divided into circular and annular areas upon the lines *a*, which indicate the divisions, as above described. These areas are again subdivided by radial division-lines *b*, extending from the center outward, so that the whole face of the target is made up of these independent sections. These sections may be supported so as to have a slight forward and backward movement independent of each other, while retaining their relative positions to each other when observed from the front. In the present case the sections have projections C formed upon them at such points as will properly balance the section. Each projection has a hole in it, and the permanent back D has pins *e* corresponding with these holes, so that the section may be placed upon them, and when all are in place the target will be complete.

Behind each section is placed a spring or springs, E, which are compressed when the section moves back by the impact of a shot, and which return the sections to their place immediately after the force of the blow has been expended. Any form of spring may be used. In some cases the spring may be placed in the sockets C, so as to act upon the pins *e*, or they may act directly upon the back of the section, as will be found most preferable.

Behind each section is placed a circuit-breaker, F, of any suitable form. This circuit-breaker lies in front of the back plate and at such a distance behind the movable face that it is free from it when the plate is in its usual position, but will be touched by the plate when the latter is forced back by the impact of a shot.

A telegraph-wire, G, is connected with each circuit-breaker, so that when any plate is forced back by the impact of a shot connection is made, and the shot and its position are at once signaled at the shooting-stand with which the wire connects. The value of the shot may be indicated in numbers by dots and dashes, and also upon a dial or other indicator, or it may be indicated upon a fac-simile of the target at the shooting-stand, so that the shooter may see at a glance not only the value of his shot, but its exact position upon the target, and he may thus change the elevation or windage of the sights, as may be desired. Any number of targets may be connected by a single wire, so that any one may be practiced upon without changing any target arrangement.

It will be readily seen that the same construction will serve to indicate the power of different guns, cartridges, and powder at varying ranges, the result being indicated in pounds or other convenient manner.

Fig. 8 shows a spring, H, of known tension, situated behind the target, so as to be acted upon and compressed by the impact of the shot upon the target-face. This spring presses upon an arm or bar, I, which, in turn, actuates an indicator-hand, L, and shows the force of each ball upon a dial or other recording-instrument.

In order to prevent any wedging of lead between the crevices of the subdivided target, the plates constituting it may be made to overlap, so that the plates in the front shall extend over the edges of those behind, and thus mark the divisions, as shown in Fig. 7. As the target is perpendicular to the line of fire, the slight difference between the level of the plates cannot be seen from the stand and will not affect the firing, and suitable stops or shoulders prevent the plates from moving too far back so as to interfere with those behind.

In some cases it may be found desirable to suspend the sections of the target from some point above, as shown in Fig. 10. In this case each section swings independent of the others, and a stop, O, at the bottom receives the impact of the swinging section, and at the same time makes the contact to indicate the shot. When constructed in this manner the spindles which support the different sections are provided with shoulders, so that when any section of the target is forced back by the impact of a shot it will be prevented by these shoulders and suitable rubber buffers from coming in contact with any of the other sections. Similar buffers prevent it from striking any plate in front of it when the action of the returning-spring again throws it forward.

I am aware that sectional targets have been heretofore made and combined with apparatus to indicate the point of contact of the shot on the target.

Fig. 13 shows a means for indicating the velocity of a shot in which the wire G may pass through as many targets at different ranges as desired. A short wire, J, extends from the main wire to the gun, so that the fall of the hammer will cut it and make a connection, which will start a timing-indicator or electric clock, K. This may be at once stopped when the shot strikes the target, and by this device the velocity of a shot for any distance with any gun or charge may be accurately determined and registered.

Having thus described my invention, what I claim as new, and desire to secure by Letters Patent, is—

1. The target consisting of the solid back plate, D, and the front plate, B, composed of independently-moving sections, in combination with a series of plungers extending through the back plate and connecting the movable sections with a spring or springs of uniform strength situated in rear of the back plate, whereby the location of a shot is indicated by the movement of the independent front sections, while its intensity is recorded by the action of the section upon the rear spring or springs, substantially as herein described.

2. The telegraphic wire G, connecting with the target A and the double-dial electric or other timing device, in combination with the side wire, J, forming a connection with the gun, and adapted to start or stop one portion of the timing device when the hammer falls and the other when the shot strikes the target, whereby the velocity of the shot may be indicated, substantially as herein described.

In witness whereof I have hereunto set my hand.

RICHARD H. SAVAGE.

Witnesses:
S. H. NOURSE,
FRANK A. BROOKS.